United States Patent [19]

Manaka

[11] Patent Number: 5,423,212

[45] Date of Patent: Jun. 13, 1995

[54] FLOW SENSOR

[75] Inventor: Junji Manaka, Omorinishi, Japan

[73] Assignee: Ricoh Seiki Company, Ltd., Tokyo, Japan

[21] Appl. No.: 79,134

[22] Filed: Jun. 18, 1993

[51] Int. Cl.⁶ ............................................. G01F 1/68
[52] U.S. Cl. .................................................. 73/204.26
[58] Field of Search ........... 73/204.26, 204.25, 204.23, 73/204.16

[56] References Cited

U.S. PATENT DOCUMENTS

| | | | |
|---|---|---|---|
| 4,478,077 | 10/1984 | Bohrer et al. | 73/204.16 |
| 4,542,650 | 9/1985 | Renken et al. | 73/204.26 |
| 4,633,578 | 1/1987 | Aine et al. | 73/204.23 |
| 4,777,820 | 10/1988 | Hetch et al. | 73/204.26 |
| 4,909,078 | 3/1990 | Sittler et al. | 73/204.26 |
| 4,912,975 | 4/1990 | Ohta et al. | 73/204.26 |
| 4,928,513 | 5/1990 | Sugihara et al. | 73/31.06 |
| 5,048,336 | 9/1991 | Sugihara et al. | 73/29.05 |
| 5,058,426 | 10/1991 | Kobayashi | 73/204.26 |
| 5,237,867 | 8/1993 | Cook | 73/204.26 |

FOREIGN PATENT DOCUMENTS

| | | | |
|---|---|---|---|
| 1-96549 | 4/1989 | Japan | G01N 27/18 |
| 3-89154 | 4/1991 | Japan | G01N 27/12 |
| 9116605 | 10/1991 | WIPO | 73/118.2 |

Primary Examiner—Richard E. Chilcot, Jr.
Assistant Examiner—Harshad Patel
Attorney, Agent, or Firm—Cooper & Dunham

[57] ABSTRACT

A flow sensor for sensing heat conduction with a high-speed response, and manufactured by applying IC micro-machining technology to have a reduced clearance between the heating portion and the sensing portion. The flow sensor has a substrate having a through hole or a cavity formed therein, whereon a heating portion and a sensing portion are formed each in the form of a layer bridged over the through hole or the cavity and supported at both ends or at one end. The heating portion and the sensing portion are laminated in two or three or more layers spaced from each other and arranged along the flow of gas to be measured. Each inner layer space is fine and accurate by precisely forming a very thin film that is removable.

9 Claims, 19 Drawing Sheets

FLOW SENSOR

BACKGROUND OF THE INVENTION

The present invention relates to a flow sensor and more particularly to one which is suitable for sensing a very small flow rate of gas. Conventionally, a flow sensor for the measurement of small flow rates of gas has a construction that includes a substrate with a through hole or a cavity formed therein; has a heating portion and a sensing portion, both of which are formed in a thin layer bridged over the through hole or the cavity and supported at both ends or at one end only.

Heat generated from the heating layer is transferred to the sensing layer in an amount corresponding to the flow rate of gas to be determined by the sensed heat's value.

To effectively heat the sensing portion, it is necessary to form the heating portion and the sensing portion possibly close to each other on the substrate by using micromachining technology. The known art however, minimized the distance between the heating portion and the sensing portion by only 2~3 μm. In addition, the known art had its limits in improving the heat's transfer efficiency because the sensing portion had one end near the heating portion but the other end far from it.

Accordingly, the transfer of heat from the heating portion to the sensing portion was uneven, i.e., efficient at the nearest end and inefficient at the furthest end.

During the measurement of the gas flow, the nearer end of the sensing portion may be, too overheated to fuse. Fusing may also occur in the heating portion when its downstream side is heated more than the upstream side by the gas flowing along that portion during the time of measuring. This can be summarized thus, that the known art sensor caused a deviation in the distribution of heat in the direction of the gas flow to be sensed.

A variety of attempts to improve the detection limits of the flow sensor in relation to its heating and sensing portions have been proposed. For example, in order to cancel the difference in output voltage, as well as the error factor and the difficulties in signal processing in a discriminator circuit, attempts were made to increase the output voltage by increasing the resistance values of the heating and the sensing elements.

The resistance values of the heating and sensing elements can be increased, e.g, by thinning the film of resistance or by narrowing a pattern's width or by increasing a pattern's length. However, thinning the resistance film may cause an increase in the defective lot and the impairment of the durability and aging characteristics. Many resistance films of less than 0.3 μm in thickness may be defective. Narrowing the pattern by micromachining is limited to 1 μm. Further narrowing causes problems with unevenness in size and quality, in production yield and in aging. Increasing the pattern's length increases the pattern's area and may increase power consumption and extend the time response. In the case of a large pattern, the distance from the heating element's end to the sensing element's end increases making it impossible to obtain the effective transfer of heat therebetween.

SUMMARY OF THE INVENTION

The primary object of the present invention is to provide a flow sensor which has minimal space between the heating portion and the sensing portion in order to achieve a high-speed response, high accuracy, high sensitivity and high efficiency in sensing small gas flows. Another object of the present invention is to provide a flow sensor which has a high heat efficiency by employing a multi-layer construction made up of a heating portion and a sensing portion in a smaller space therebetween.

Another object of the present invention is to provide a flow sensor which has a space of 0.3 to 10 μm between the heating layer and the sensing layer and which is achieved by accurately forming the thickness of the inner layer.

Another object of the present invention is to provide a flow sensor having a high efficiency of heat transfer wherein heat from a heating portion can be uniformly distributed and can be evenly received by a sensing portion.

Another object of the present invention is to provide a flow sensor that is reliable, and has a long life, wherein gas is fed to a heating portion and a sensing portion through a porous layer which serves as an element for forming laminar flows as well as for serving as a dust filter.

Another object of the present invention is to provide a flow sensor comprising a substrate with a through hole or a cavity formed therein, a heating portion and a sensing portion, both of which are formed in a thin layer bridged over the through hole or cavity and supported at both ends or at one end only, characterized in that the heating portion and the sensing portion are integrated into two or three layers or more with interlayer spacing along the direction of the gas flow.

DESCRIPTION OF THE PREFERRED EMBODIMENTS

Figure 1A:
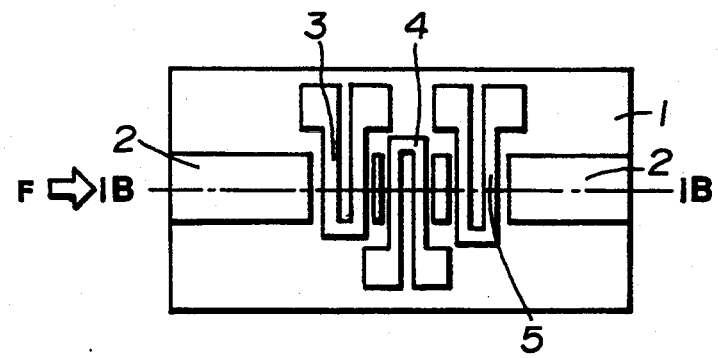
FIGS. 1(a) and 1(b) are views for explaining an example of a conventional flow sensor.
Figure 1B:
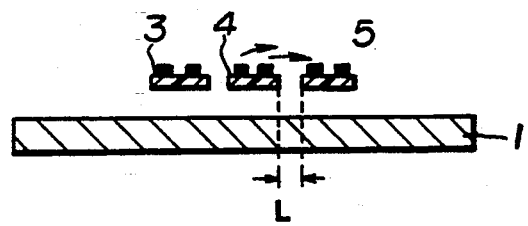

FIG. 1 is a view showing the essence of the construction of a conventional flow sensor. FIG. 1(a) is a plane view and FIG. 1(b) is a section taken along line I—I of FIG. 1(a). Numeral 1 designates a substrate 1 with a through hole or a cavity 2 formed therein, whereon are disposed a heating layer 4 at a middle position and two sensing layers 3 and 5, one at both (front and rear) sides of the heating layer 4 in the direction of the gas flow. All layers are bridged over the through hole, or the cavity and supported at both ends or at one end only on the substrate.

As is well known, when gas flows in the direction shown by an arrow F along the substrate, the gas flow takes heat from the heating portion 4 being heated by an electric current and then transfers the heat to the sensing portion 5 which in turn increases its temperature by thermal conduction according to the flow rate. Consequently, if the sensing portion 5 is a resistance having a positive temperature coefficient, it may determine the flow rate as an increment of its resistance. In this case, the sensing portion 8 may be used as a resistance for compensating the effect of the ambient temperature or a sensing unit when gas flows reverse their direction F.

To heat the sensing portion 5 more effectively by the heating portion 4, it is necessary to make the heating portion 4 and the sensing portion 5 approach each other as much as possible by using known micro-machining technology. The conventional sensor, however, minimized the distance L between the heating portion and the sensing portion by only 2~3 μm. In addition, the improvement of the heat transfer efficiency in the conventional sensor was limited because the sensing portion 5 was near the heating portion 4 at its left side end but was far from its right side end.

A variety of attempts to improve the detection limits of the flow sensor in relation to its heating and sensing portions have been proposed. For example, in order to cancel the difference in output voltage, the error effect and difficulties of signal processing in a discriminator circuit, an increase in output voltage has been proposed by increasing the resistance value of the heating and sensing elements.

In the case shown in FIGS. 1(a) and 1(b), the resistance value can be increased, e.g., by thinning a film of resistance or by narrowing a pattern's width or increasing a pattern's length. However, thinning resistance films may cause an increase in defective lots and an impairment of their durability and aging.

Many resistance films of less than 0.3 μm in thickness may be defective. Narrowing the pattern by micro-machining is limited to 1 micron. Further narrowing causes problems with unevenness in size and quality, production yield and aging.

Increasing the pattern's length increases the pattern's area that may increase power consumption and extend the time response. At a large pattern area, the distance from the heating element's end to the sensing element's end increases to make it impossible to achieve an effective heat transfer therebetween.

Figure 2:
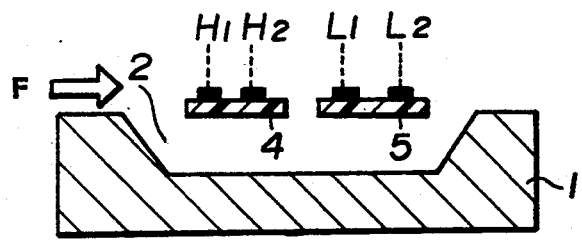
FIG. 2 is a view for explaining the relation between the heating portion and the sensing portion of a conventional flow sensor.

FIG. 2 is a view for explaining the relation between the heating portion 4 and the sensing portion 5 of the conventional flow sensor. Heat from a resistance H2 of the heating portion 4 may be effectively transferred to a resistance L of the sensing portion 5 because of a small distance between them, but heat from the resistance $H_1$ of the heating portion 4 may be less transferrable to a resistance $L_2$ of the sensing portion 5 at a reduced heat transfer efficiency because of a larger distance therebetween. When gas flows, the temperature of the element $H_2$ on the heating portion 4 becomes higher than that of the element $H_1$ thereon. Therefore, the element $H_2$ may be partially heated in order to fuse.

Figure 3:
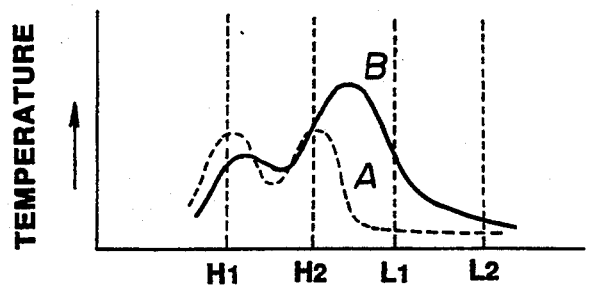
FIG. 3 is a diagram showing the temperatures of portions of the flow sensor shown in FIG. 2.

FIG. 3 is a graph showing the temperatures of the elements shown in FIG. 2. Curve A shows the temperatures of the elements when gas is still, and curve B shows the temperatures of the elements when the gas is flowing. As previously described, the temperatures of the resistance $L_1$ does not increase due to a large distance from the heating elements and thereby the sensitivity of the sensor is low. On the other hand, elements $H_1$ and $L_1$ may be locally heated to fuse when gas flows. It may be concluded that the conventional sensor involves a deviation in heat distribution along the direction F of the gas flow therein.

In view of the foregoing, the present invention was made to provide a high-speed response heat-transfer detection type flow sensor that is manufactured by using micro-machining technology of IC production and that has an increased response, accuracy and sensitivity in sensing a very small flow of gas and has an improved efficiency of heat transfer from a heating portion to a heat sensing portion by further shortening of the spatial distance therebetween.

Figure 4:
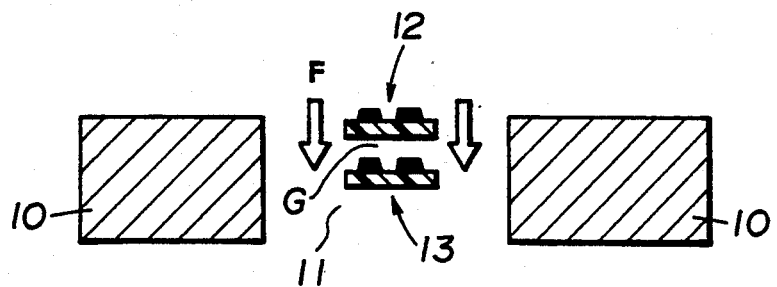
FIG. 4 is a sectional construction view of an essential part of a flow sensor embodied in the present invention.

FIG. 4 is a view showing the essence of construction of a flow sensor embodied in the present invention. In FIG. 4, numeral 10 designates a substrate with a through hole or a cavity 11 formed therein, wherein a heating portion 12 and a sensing portion 13 are bridged over the through hole or the cavity 11 and supported at both ends or at one end only on the substrate 10. In the shown embodiment, the heating portion (heating element) 12 and the sensing portion (heat receiving element) 13 are formed in layers along the direction F of the gas flow. In FIG. 4 the gas flow is directed downward and the heating portion 12 and the sensing portion 13 are arranged with the former above the latter in the flow's direction F. The space G between the heating portion 12 and the sensing portion 13 can be finely formed by adjusting the thickness of a removable spacing film in a range of 0.3 to 10 μm at a high accuracy that makes it possible to place the heating and sensing portions near each other to comply with a very small flow of gas to be measured. Accordingly, thus formed flow sensor can also attain greatly improved heat-transfer efficiency because the heating portion 12 has an even heat distribution and the sensing portion 13 receives the heat evenly.

Figure 5A:
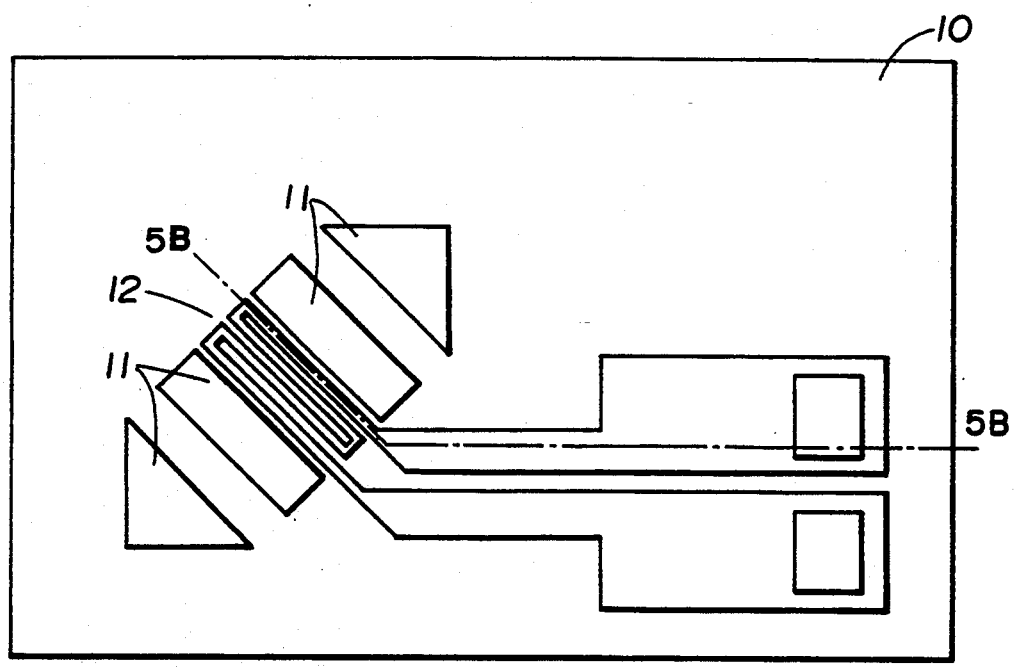
FIGS. 5(a) and 5(b) are views for explaining the construction of a heating portion of a flow sensor according to the present invention.
Figure 5B:
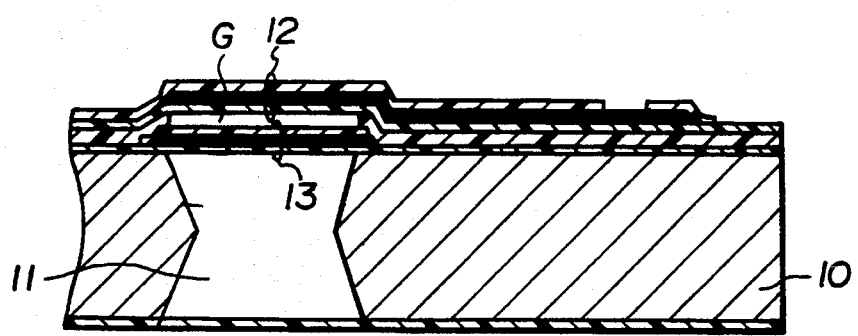
Figure 6A:
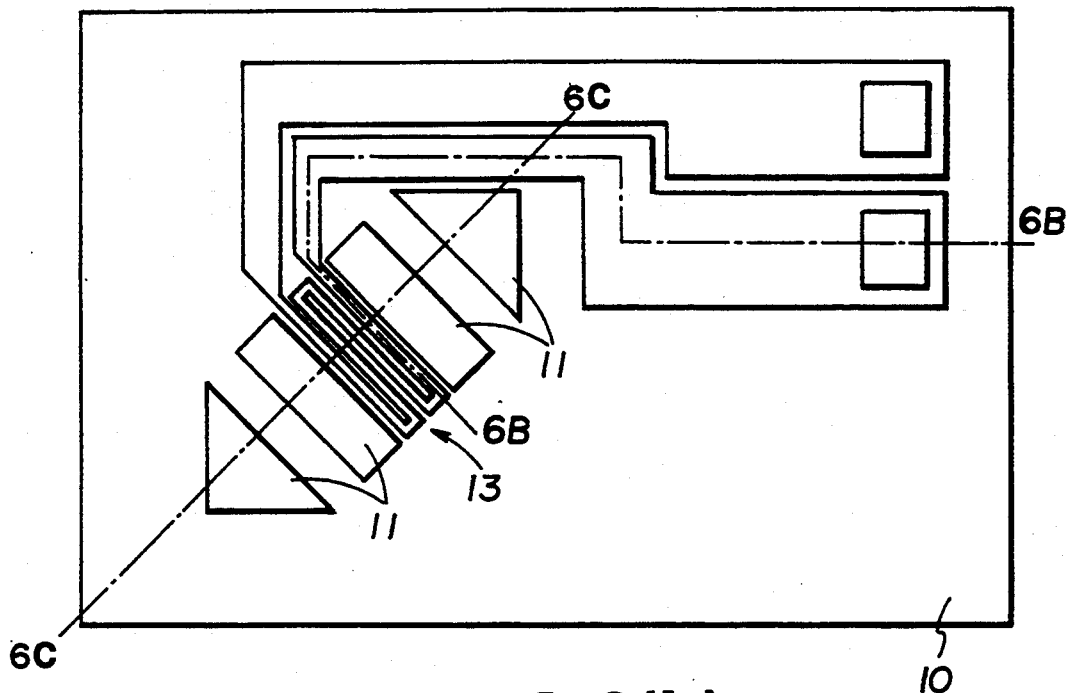
FIGS. 6(a), 6(b) and 6(c) are views for explaining the construction of a sensing portion of a flow sensor according to the present invention.
Figure 6B:
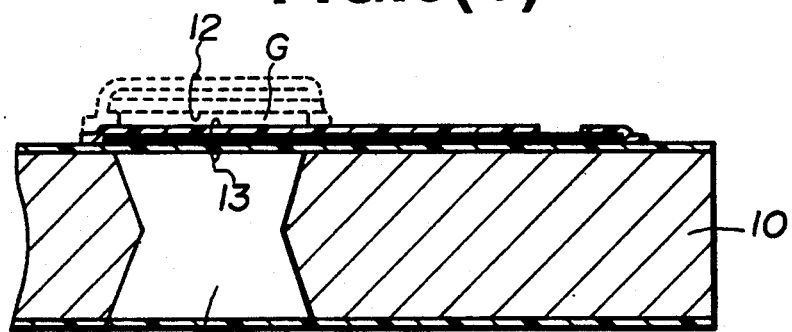
Figure 6C:
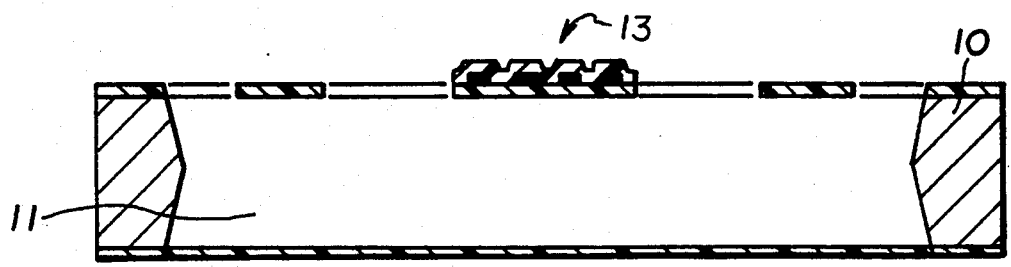

FIGS. 5(a), 5(b), FIGS. 6(a), 6(b) and 6(c) are schematic views for explaining the construction of a flow sensor embodied in the present invention. FIG. 5(a) is a plane view of the upper heating portion of the flow sensor and FIG. 5(b) is a sectional view taken on line I—I of the FIG. 5(a). FIG. 6(a) is a plane view of the lower sensing portion of the flow sensor and FIGS. 6(b) and 6(c) are sectional views taken on lines I—I and II—II, respectively, of FIG. 6(a).

In FIGS. 5(a), 5(b), FIGS. 6(a), 6(b) and 6(c), numeral 10 designates a substrate with a through hole 11 formed therein and numerals 12 and 13 denote an upper heating portion and a lower sensing portion, respectively, disposed in layers and bridged across the through hole and supported at both ends or at one end on the substrate.

The above-mentioned portions are formed by the following method:

The sensing portion 13 is first formed on the substrate as shown in FIGS. 6(a), 6(b) and 6(c), then a spatial pattern G is formed on a respective area by applying thereto any one of the materials such as Al, Ni, Mo, SiO₂, Ti, W, polyimid and so on and then the heating portion 12 is formed on the spatial pattern G as shown in FIGS. 5(a) and 5(b). The open space G is created by removing the spatial pattern material (Al, Ni . . . ,) with eluent. The through hole 11 may be formed beforehand, as mentioned above or after forming the open space G.

Figure 9A:
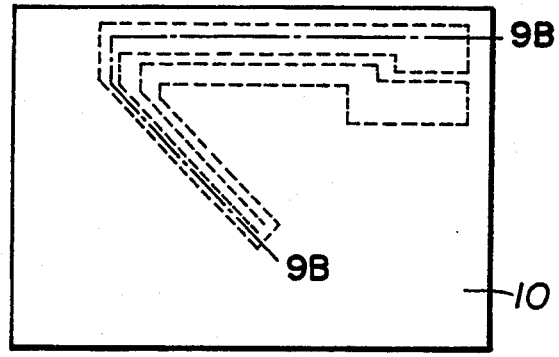
FIGS. 9(a) and 9(b) are views for explaining a part of another process for forming a spatial interlayer between the under-sensing layer and the upper heating layer.
Figure 9B:
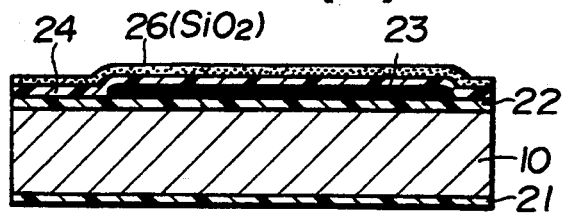
Figure 10A:
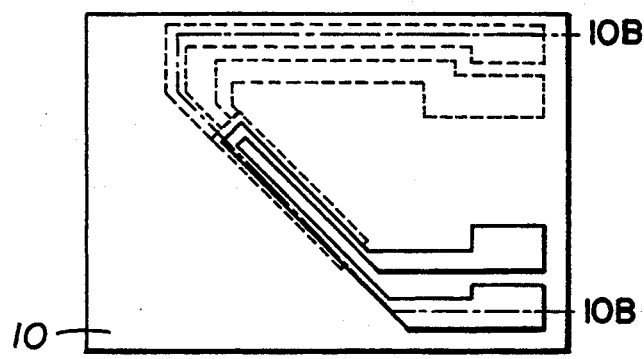
FIGS. 10(a) and 10(b) are views for explaining a process for forming a heating layer on a layer of space forming material.
Figure 10B:
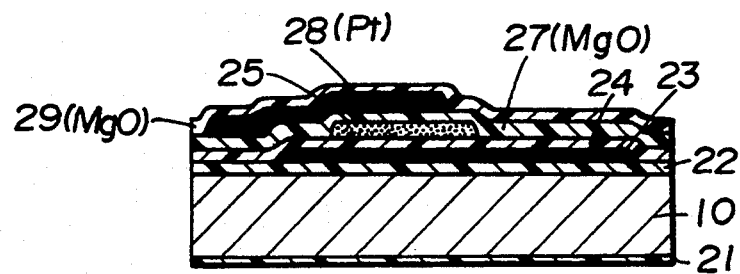
Figure 11A:
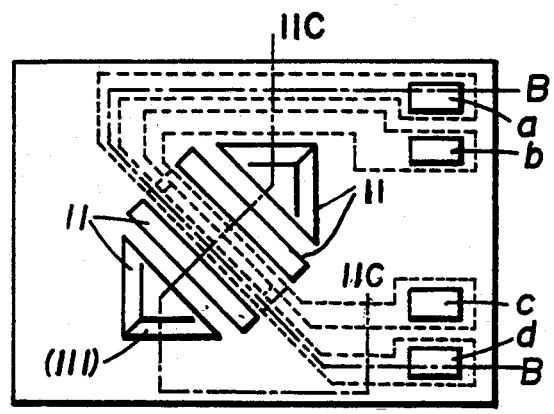
FIGS. 11(a), 11(b) and 11(c) are views for explaining a process for making a window to form a through hole and leading electrodes for connecting bonding wires thereto.
Figure 11B:
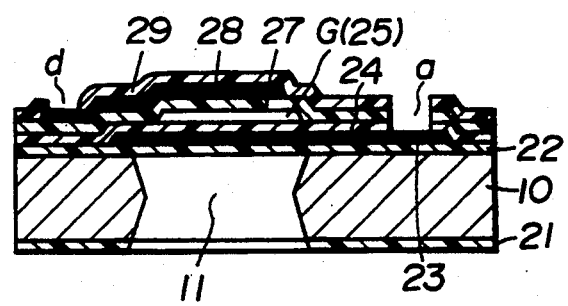
Figure 11C:
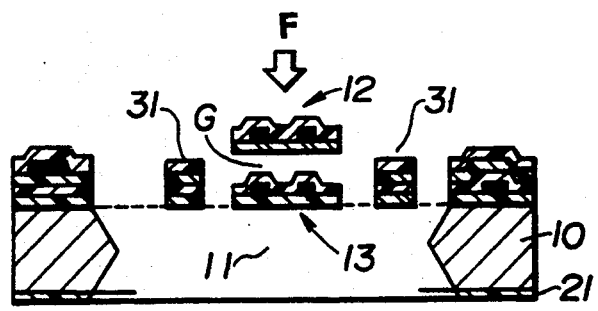

Referring now to FIGS. 7(a), 7(b), 7(c), FIGS. 8(a), 8(b), FIGS. 9(a), 9(b), FIGS. 10(a), 10(b), and FIGS. 11(a), 11(b), 11(c), details of a method for manufacturing the above-mentioned flow sensor will be described as follows: FIGS. 7(a), 8(a), 9(a), 10(a) and 11(a) are plane views, FIGS. 7(b), 8(b), 9(b), 10(b) and 11(b) are sections taken on line I—I of respective figures (a), and FIG. 11(c) is a section taken on line II—II of FIG. 11(a)

Figure 7A:
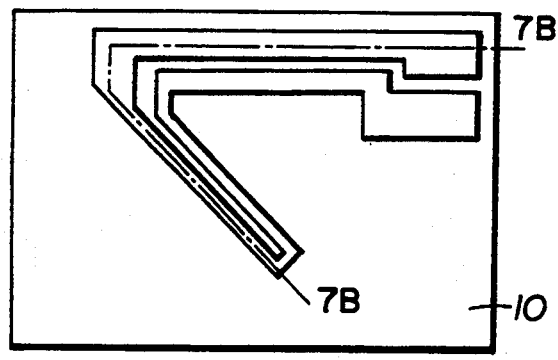
FIGS. 7(a) and 7(b) are views for explaining the details of a method for manufacturing a flow sensor.
Figure 7B:
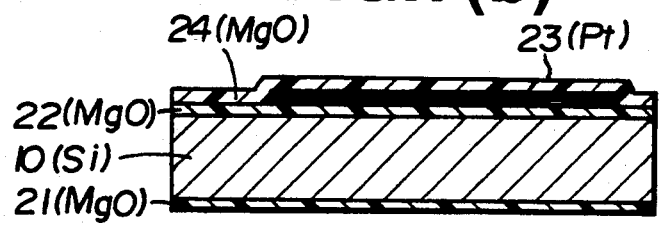
Figure 8A:
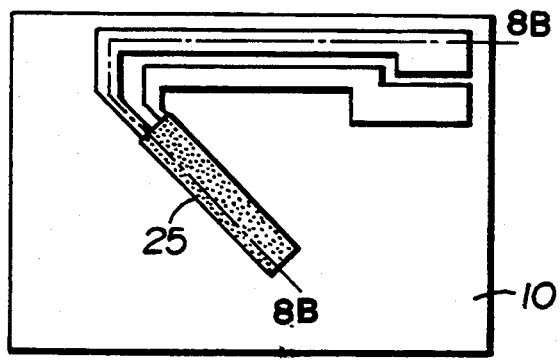
FIGS. 8(a) and 8(b) are views for explaining a part of the process for forming a spatial interlayer between the under-sensing layer and the upper-heating layer.
Figure 8B:
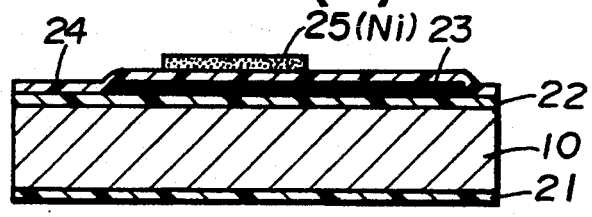

In FIG. 7(a) and FIG. 11(c), numeral 10 designates a substrate made up of any one of several materials (epoxy or such as Si, glass, alumina, heat resistant (epoxy or polyimid) resin, Ni, Cr, NiCr, Mo, W, Al, Cu, stainless steel, copal and so on, whereas a heat-resistant insulating layer 22 of any one or a combination of two or more kinds of materials such as MgO, SiO₂, Si₃N₄, Al₂O₃ and Ta₂O₅ is formed to be of 0.2 to 3.0 μm by CVP, using depositing or a sputtering method. In case it will be necessary to adjust the form of the substrate when forming the through hole therein, a multi-layer substrate made of a combination of unlike materials, e.g., Ni/Al/Ni or Cu/polyumid/Cu may be selected to be used. Numeral 23 denotes a layer of resistance, which is formed as a film of 0.1 to 3.0 μm in thickness by depositing or sputtering heater material, e.g., NiCr, TaN, Pt, SiC, W, kantal or the like and then is etched by patterns to form thereon a connecting portion of electrodes, leads and a heating portion. An upper layer 24 is finally applied in a like manner as the heat-resistant insulating layer 22 and finally a lower sensing layer is completed as shown in FIGS. 7(a) and 7(b). FIGS. 8(a) and 8(b) are views showing a layer 25 for forming a space G, which is formed by depositing or sputtering any one of Ni, Cu, Mo, Ti, Al, W, NiCr, Cr in the form of a film of 0.2 to 10 μm on the lower sensing portion shown in FIGS. 7(a) and 7(b) and thee by pattern etching. It is also possible to apply, instead of the material 25 of FIGS. 8(a) and 8(b), any one of several materials such as SiO₂, Ni, Cu, Mo, Ti, Al, W, NiCr, Cr to form a film 26 of 0.2 to 10 μm, as shown in FIG. 9(b), in a like manner to the layer 25. However, in this case, the pattern etching can be omitted.

FIGS. 8(a), 8(b), and FIGS. 9(a), 9(b) are views for explaining a process for forming a space G between the lower sensing layer and the upper heating layer.

In a subsequent process, the whole layer of material 25 shown in FIGS. 8(a) and 8(b) or a part of the layer of material 26 shown in FIGS. 9(a) and 9(b) shall be selectively removed by side etching with care not to etch any other layer. Accordingly, it is necessary to select the correct combination of materials used in etching.

FIGS. 10(a) and 10(b) are views for explaining the process of forming an upper layer of a heating portion on the layer of space forming material 25 shown in FIGS. 8(a) and 8(b). After the layer of space-forming material 25 was formed as shown in FIGS. 8(a) and 8(b), a MgO-layer 27 is formed overall, a Pt-layer 28 is patterned thereon and then an MgO-layer 29 is further formed overall. The layer 27 is formed under the same conditions as the layer 22, the layer 28 is formed under the same conditions as the layer 23, and the layer 29 is formed under the same conditions as the layer 24. By doing so, the upper layer and the lower layer agree with each other in thermal conditions and that stabilizes the detection power of the flow sensor. This is very desirable.

FIGS. 11(a), 11(b) and 11(c) are explaining a process for making upper and bottom windows for forming electrodes a, b, c and d for connecting of bonding wires and for forming a through hole 11 in a substrate. The MgO-layer is etched through dry etching with plasma of $CF_4$ or $CF_4+O_2$ or by ion etching with an ion of At+. Then, the through hole is formed in a substrate 10 by anisotropically etching silicon monocrystals of the substrate 10 with ethylenediamine +catechol or an aqueous solution of NaOH or KOH or an aqueous ammonia.

In FIGS. 11(a), 11(b) and 11(c), the silicon (100) plane substrate, whereon a heating portion is disposed at an angle of 5° to 850° (45° in the shown case) to a (111) plane's face for etch stopping. The substrate is then etched from both opposite (upper and bottom) sides to form a through hole 11 therein. An open space G is formed by side etching the Ni-layer 25 with an etching such as an aqueous solution of $HNO_3$ or phosphoric acid from its side face already exposed at the time of etching the MgO-layer. Blocks 31 shown in FIG. 11(c) serve as elements for rectifying the gas flow F.

Figure 12:
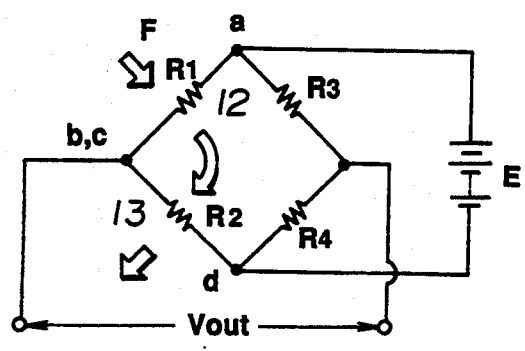
FIG. 12 is a view showing a bridge circuit formed by connecting leading electrodes.

As shown in FIG. 12, lead-out electrodes a, b and c of the flow sensor are connected with each other to form a bridge circuit which includes a resistance R1 corresponding to the upper heating layer and a resistance R2 corresponding to the lower sensing layer. When gas flows in the direction F through the resistances R1 and R2 of the flow sensor, an output voltage corresponding to the flow of gas appears across the output terminals of the bridge circuit.

Figure 13A:
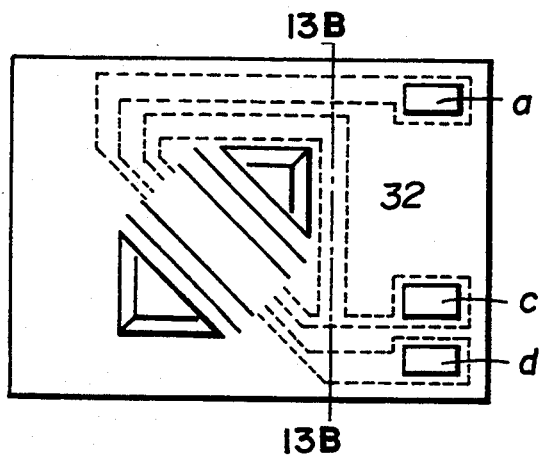
FIGS. 13(a) and 13(b) show a modification of the embodiment shown in FIGS. 11(a) and 11(b).
Figure 13B:
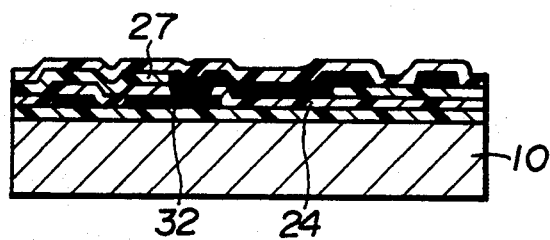
Figure 18A:
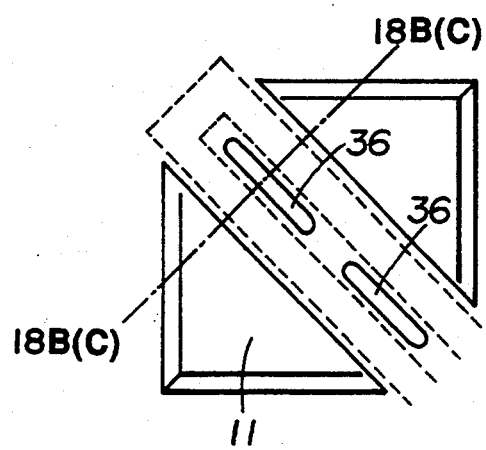
FIGS. 18(a), 18(b) and 18(c) illustrate an example of a narrow hole being provided in both the upper and under layers or in the upper layer only.
Figure 18B:
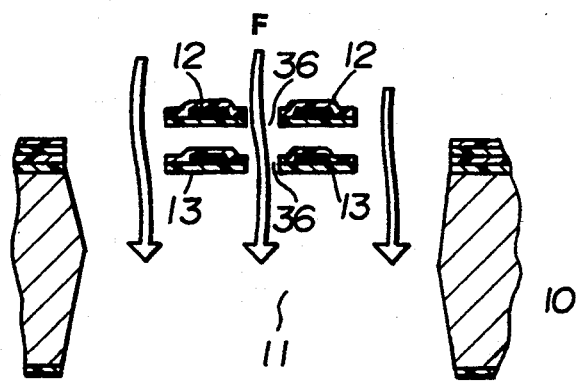

FIGS. 13(a) and 13(b) show a modified example of the embodiment of FIGS. 11(a), 11(b) and 11(c). As can be seen in FIG. 12, the electrodes b and c are short circuited. In the case of FIGS. 18(a) and 18(b) these electrodes are connected by connecting lead patterns of the flow sensor. Numeral 82 designates the connected portion that is formed at the step of FIGS. 10(a) and 10(b) by selectively removing with etchant a part of the MgO-layers 24 and a part of the MgO-layer 27 to connect the under Pt-layer 23 with the upper Pt-layer 28. This makes it possible to save an unnecessary electrode and its wiring.

Figure 14:
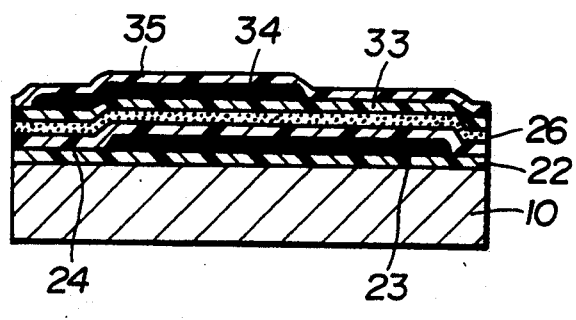
FIG. 14 illustrates a modified example of the embodiment shown in FIGS. 9(a) and 9(b).
Figure 15:
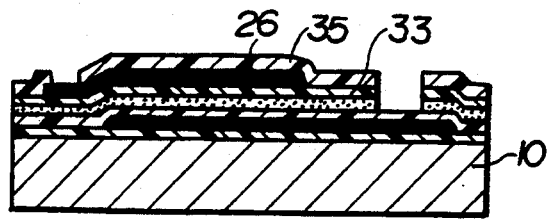
FIG. 15 is a view for explaining the process for making a window for forming a through hole and leading electrodes for connecting bonding wires thereto, succeeding the process of FIG. 14.
Figure 16:
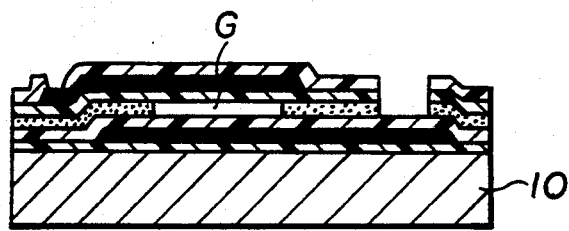
FIG. 16 is a view for explaining the process succeeding the process shown in FIG. 15.

FIGS. 14 to 18 are views for explaining a subsequent process for a modified example of the embodiment shown in FIGS. 9(a) and 9(b). An MgO-layer 33, a Pt-layer 34 and an MgO-layer 35 are formed in said order on an $SiO_z$-layer 26 as shown in FIG. 14, then a window for making electrodes and a through hole is opened by plasma etching MgO-layers 33 and 35 and by removing with phosphoric acid a part of the exposed $SiO_2$-layer 26 as shown in FIG. 15. The exposed MgO-layer is further etched by plasma etching and the SiO-layer is etched from both sides to complete the through hole. An intermediate $SiO_z$-layer 26 is etched by side-etching from its exposed wall to form an open space G as shown in FIG. 16. A flow sensor chip shown in FIG. 16 is thus completed.

Figure 17A:
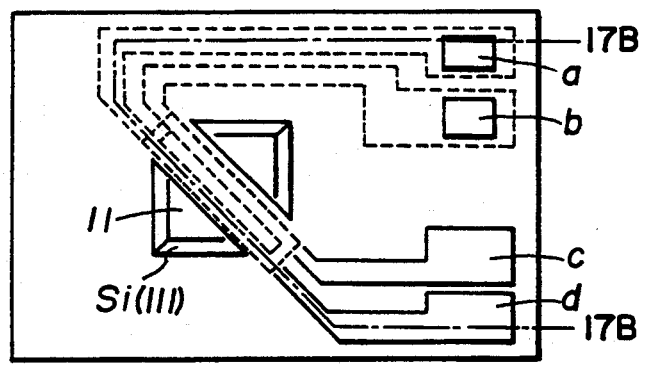
FIGS. 17(a) and 17(b) show an example of a flow sensor wherein the upper heating layer and the under sensing layer are formed by resistance films only.
Figure 17B:
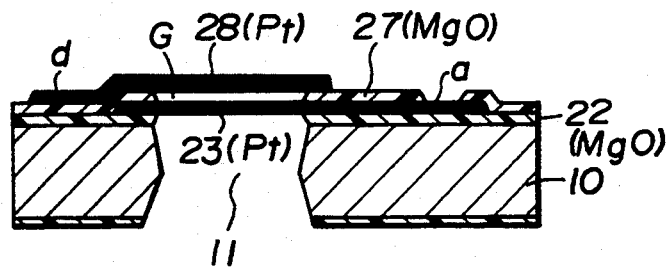

FIG. 17(a) and 17(b) exemplify an upper heating layer and a lower sensing layer, each of which is made of Pt-resistance film only. In all embodiments shown in FIGS. 7(a) through 16, Pt-layers near a through hole 11 are covered by insulating material, e.g., an MgO-layer. On the contrary, the embodiment shown in FIGS. 17(a) and 17(b) does not use the insulating material MgO. This omits insulating material layers not directly concerned with heating in the upper heating portion and saves the heating capacity for heating the insulating material, thereby the upper heating portion can have a shorter temperature rising time, less power consumption and a longer life. The lower sensing portion may rise in temperature faster and become higher in sensitivity.

Figure 18C:
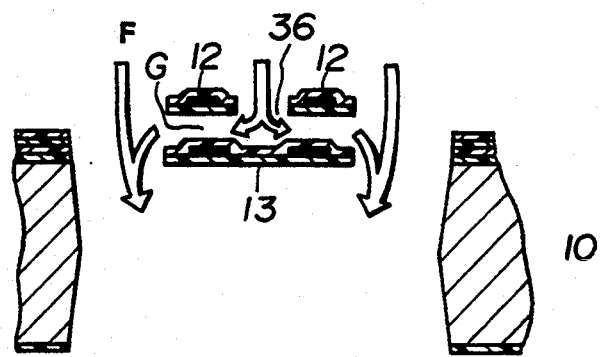

FIGS. 18(a), 18(b) and 18(c) exemplify a modification of the embodiment shown in FIGS. 7(a) to 16. The modified embodiment has the slots 36 in an upper heating layer and a lower sensing layer or in the upper heating layer only. FIG. 18(a) is a plane view, FIG. 18(b) is a sectional view taken on line B—B of FIG. 18(a) when slots are provided in both upper and lower layers and FIG. 18(c) is a sectional view taken on line II—II (the same as that taken on line I—I) of FIG. 18(a) when slots are provided in the upper layer only. These drawings show slots 36 near a through hole 11. FIG. 18(b) shows an example of providing slots 86 in a part of a heating portion (upper layer) 12 and in a part of a sensing portion (lower layer) 18 to eliminate uniformity of the gas flow and to obtain a high efficiency of detection. FIG. 18(c) shows a case where slots 36 are provided in the upper layer (heating portion) 12 only without providing slots in the lower layer (sensing portion) 13. In this case, gas enters a space G through the slots 36 of the upper layer and flows along an inner layer clearance between the upper and lower layers. While in FIGS. 18(b) and 18(c) a sensor having two slots is exemplified, it will be obvious that the sensor may have a chain of holes or a number of slots.

Figure 19:
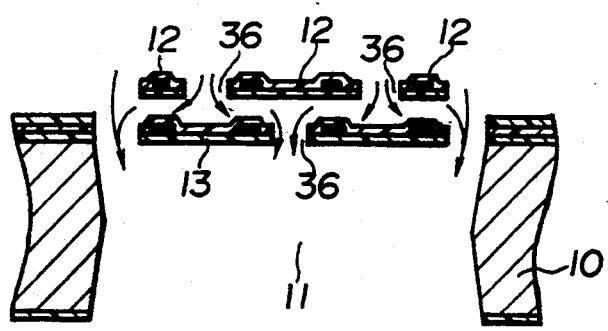
FIG. 19 is a sectional construction view showing an example of narrow holes in an upper layer and an under layer being arranged to shift from each other.

FIG. 19 is a sectional construction view of an embodiment wherein slots in the upper heating layer 12 are arranged apart from the slots in the lower sensing layer 13 to allow gas to flow all over the heating and sensing layer. This realizes an effective exchange of heat and further increases the sensitivity of the sensing portion. Heat can be evenly transferred to the sensing layer that may have an improved sensitivity to a gas flow, i.e., an improved signal-to-noise ratio.

The uniform distribution of heat in the heating layer may eliminate the possibility of its fusing or deteriorating due to local overheating. All these effects are expected to be realized in the shown embodiment.

Figure 20:
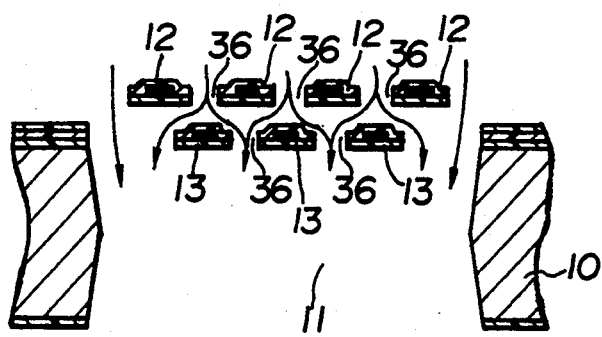
FIG. 20 is a sectional construction view showing an example of an upper heating layer and an under-sensing layer arranged to be shifted from each other.

FIG. 20 is a sectional construction view of an embodiment wherein a heating pattern of an upper layer 12 and a sensing (heat receiving) pattern of a lower layer are arranged apart from each other. As compared with the embodiment of FIG. 19, this embodiment has an increased number of slots 36 that may completely distribute the gas flow to all the whole surfaces of the sensing portion.

Figure 21A:
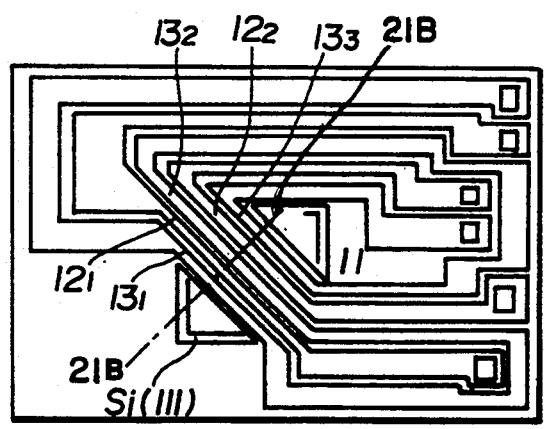
FIGS. 21(a) and 21(b) are views showing a case where an upper layer and a lower layer are formed in different positions and shifted from each other in the same process.
Figure 21B:
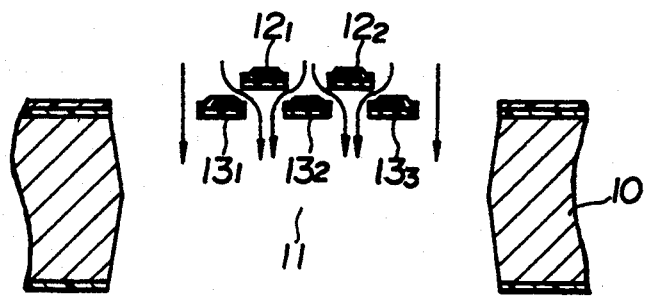

FIGS. 21(a) and 21(b) show an example of a sensor having an upper heating layer 12 and a lower sensing layer that are formed by the same process. FIG. 21(a) is a plane view and FIG. 21(b) is a sectional taken on line B—B of FIG. 21(a). As shown in FIGS. 21(a) and 21(b), the upper heating layers $12_1$ and $22_2$ and the lower sensing layers $13_1$, $13_2$ and $13_3$ may be formed at different levels by the same forming process that not only simplifies the process but also obtains the same quality and uniform characteristics (as to show resistance value and aging) of the upper and lower layers. This process is advantageous by virtue of its uniformity, high yield and forming of durable film.

Figure 22A:
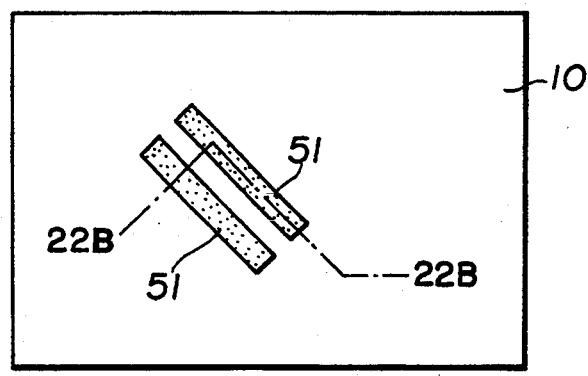
FIGS. 22(a), 22(b) and 22(c) are views explaining how to manufacture a flow sensor in the case of forming an upper layer and an under-layer in the same process.
Figure 22B:
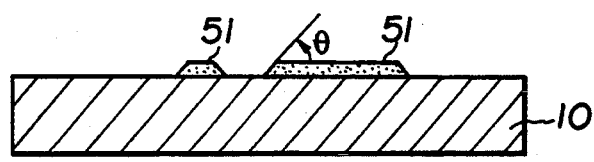
Figure 22C:
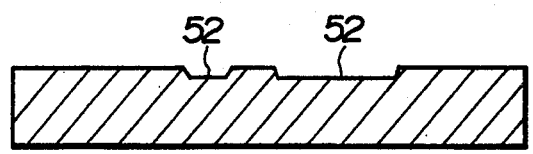

Referring now to FIGS. 22(a), 22(b) and 22(c), a method for manufacturing a flow sensor by forming its upper and lower layers by the same process will be explained as follows A film 51 of any one of several materials such as Ni, Cu, Ti, Mo, W, Cr, Al or SiO$_2$ (within the range of 0.5 to 10 μm in thickness) is deposited or sputtered on to a silicon substrate and then photoetched to form rectangles shown in FIG. 22(a). This rectangular film 51 is desirable to have an edge rising angle of not more than 450°, as shown in FIG. 22(b), not to cause a stepwise edging since the heating layer must be subsequently formed thereon. This can be achieved by sideways photoetching. FIG. 22(c) is a view showing another embodiment different from that of FIG. 22(b).

In this embodiment, groove patterns 52 similar to the patterns 51 are formed on a silicon substrate 10 by removing silicon by 1 μm in depth (within the range of 0.5 to 10 μm) by isotropically or anisotropically etching, if the silicon substrate being of (100) plane face, to provide the (111) plane by film 51. This process proceeds to a process which will be explained with reference to FIG. 25.

Figure 23A:
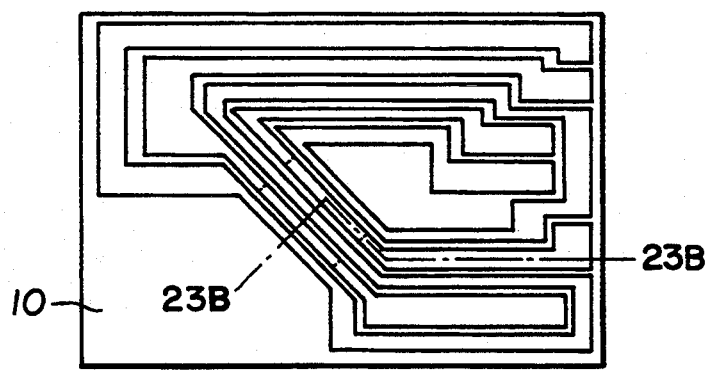
FIGS. 23(a) and 23(b) are views showing a process succeeding to the process shown in FIG. 22(c).
Figure 23B:
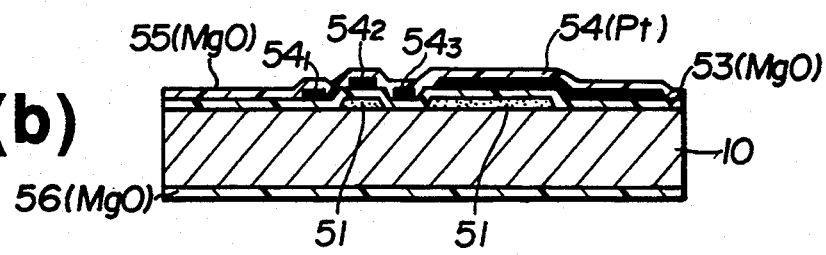
Figure 24:
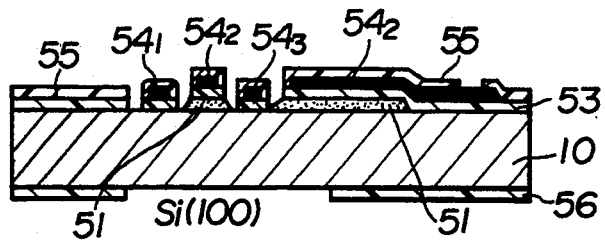
FIG. 24 is a view showing a method for removing a window, for etching out patterns of electrodes, a heating layer, a sensing layer and some silicon.

FIGS. 23(a) and 23(b) are succeeding steps of the process shown in FIG. 22(b). A MgO-layer 53 and a Pt-layer 54 are formed in said order on the rectangular patterns 51 and then an MgO-layer 55 is applied thereon. At this time, the upper heating layer 54$_2$ is disposed on the pattern 51 and the lower sensing layers 54$_1$ and 543$_3$ are deposited at both sides of the pattern 51. An MgO-layer is applied over the whole rear surface of the substrate 10. This layer may be previously deposited at the step shown in FIG. 22(b). After this, the layers 55 and 56 are removed by photoetching or plasma etching as shown in FIG. 24 and then electrodes'patterns, a heating layer pattern and a sensing layer pattern and a window for etching silicon are removed.

An Al-film of the layer 51 (if it is Al) is completely removed by side-etching with acid. A through hole is then formed in the silicon substrate 10 by anisotropically etching the substrate from the upper and bottom surfaces thereof. The embodiment shown in FIG. 21(a) is now completed.

Figure 25:
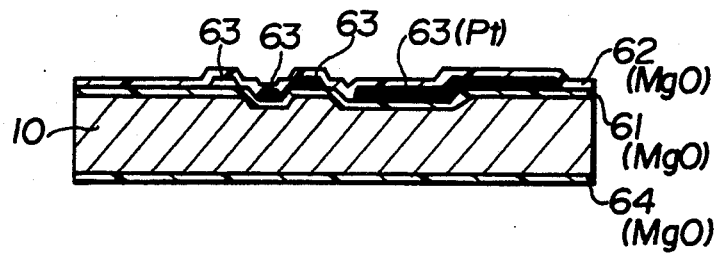
FIG. 25 is a view showing a process succeeding to the process shown in FIG. 22(c).
Figure 26:
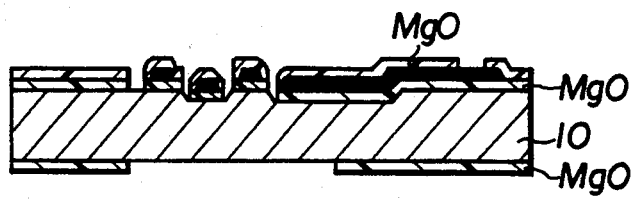
FIG. 26 is a view showing pattern etching of an MgO-layer.
Figure 27:
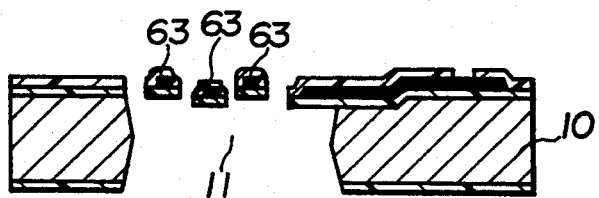
FIG. 27 is a view showing a method for completing a through hole by anisotropically etching from the reverse side of the substrate shown in FIG. 26.

FIG. 25 is a view for explaining a process subsequent to the process shown in FIG. 22(c). Numerals 61 and 62 designate MgO-layers, numeral 63 designates a Pt-pattern and numeral 64 designates an MgO-layer. After these layers have been formed on the substrate 10 as shown in FIG. 25, the MgO-layers are pattern-etched as shown in FIG. 26 and then the MgO-layer and the substrate 10 are anisotropically etched from the rear side to form a through hole 11 as shown in FIG. 27.

Figure 28A:
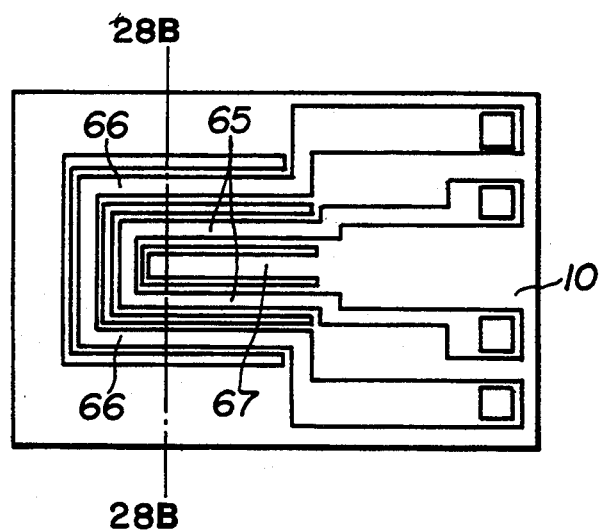
FIGS. 28(a) and 28(b) are views showing an example of a flow sensor wherein a plurality of flow rectifying elements are formed to improve the heat transfer efficiency of the sensor.
Figure 28B:
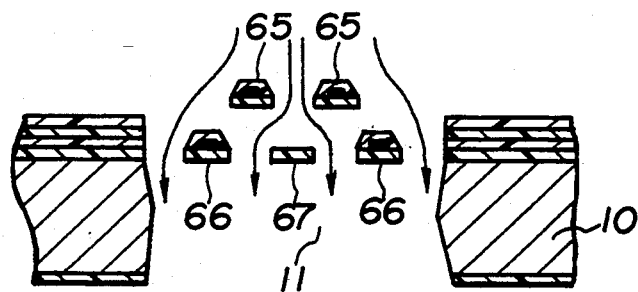

Referring now to FIGS. 28(a) and 28(b), another embodiment of the present invention, wherein a flow-rectifying element is formed among components of a flow sensor to improve the efficiency of heat transfer therein, will be explained as follows: In FIG. 28(a) and 28(b), the sensor comprises an upper heating element 65, a lower sensing element 66 and a flow rectifying element 67 provided for regulating a passage of gas to effectively transfer heat from the heating element 65 to the sensing element 66. If a sensing element is additionally provided in place of the flow rectifying element 67, said sensing element may receive much more heat from the heating element 65 and heated to a higher temperature than the externally disposed sensing element. But, if the temperature distribution of the additional sensing element is the same as that of the external sensing element, the sensor may not have a complicated output characteristic and thereby its output signal can be easily processed in the sensor's circuit.

However, the provision of the sensing element in place for the rectifying element 67 shown against the inside space of the heating element 65 increases the density of the components in the substrate that requires precisely forming the elements thereby decreasing the workability of the sensor. On the other hand, if nothing is provided at said place to allow gas to pass therethrough, the external sensing element 66 may be insufficiently heated and does not attain high detection efficiency. The shown embodiment, therefore, employs a provision of the flow rectifying element 67 to force the gas flow to get closer to the sensing element 66.

Figure 29A:
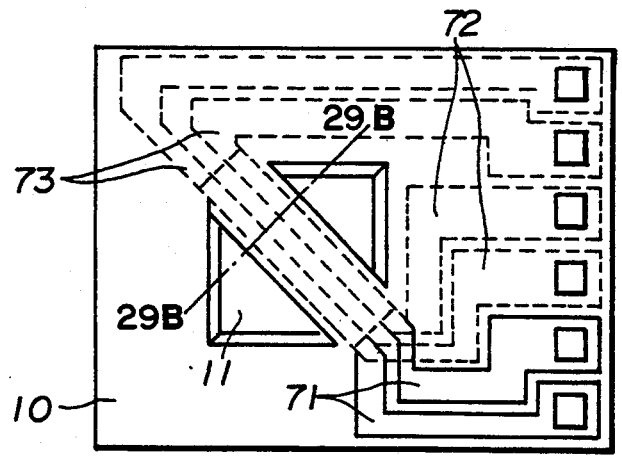
FIGS. 29(a), 29(b) and 29(c) are views showing an example of a flow sensor which is constructed of three layers, i.e., an upper sensing layer, a middle heating layer and an under sensing layer.
Figure 29B:
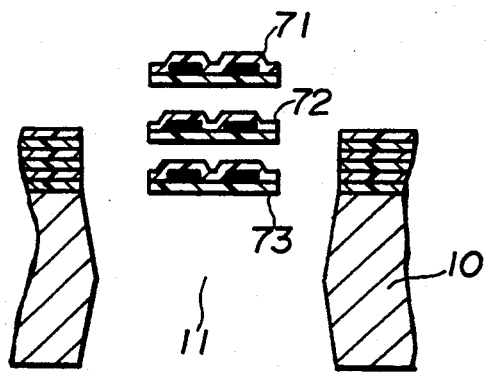
Figure 29C:
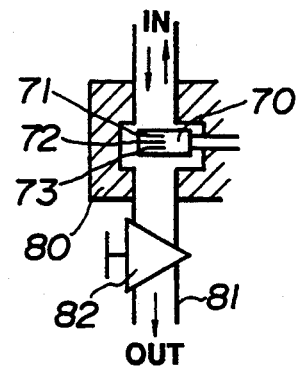

FIGS. 29(a), 29(b) and 29(c) are views for explaining a flow sensor embodying the present invention which has a multi-stage construction comprising of an upper sensing layer, an intermediate heating layer and a lower sensing layer. While a two-stage type flow sensor, having an upper heating layer and a lower sensing layer, has been described up to here, it is also possible to design a flow sensor in a three stage construction that comprises an upper sensing layer 71, an intermediate heating layer 72 and a lower sensing layer 73 as shown in FIGS. 29(a), 29(b) and 29(c). The arrangement of the intermediate heating layer 72 between the upper sensing layer 71 and the lower sensing layer 73 makes it possible to sense the flow of gas when its direction is reversed. The shown embodiment includes 6 pieces of lead-out electrodes that, however, may be reduced to 4 pieces by commonly using electrodes. It may have slots similar to those shown by numeral 36 in FIGS. 18(a), 18(b) and 18(c).

FIG. 29(c) is a view for explaining an example of an application of the above-mentioned three-stage type flow sensor. In FIG. 29(c), there is shown a flow measuring system which includes a flowmeter unit 80, a conduit 81, a valve 82 and a flow sensor 70 comprising an upper sensing layer 71, an intermediate heating layer 72 and a lower sensing layer 73 as shown in FIGS. 29(a) and 29(b). In FIG. 29(c), when gas flows in the direction from IN to OUT, the sensing portion 73 receives heat generated by the heating portion 72 and changes its resistance value to determine the gas flow.

When the valve 82 is closed, the gas flow stops without causing a heat exchange with the flow sensor. If gas leaks in the inlet side "IN" of the conduit, the gas may temporally flow along the conduit in the reverse direction from "OUT" to "IN" (due to a drop in pressure from the inlet side). In this case the flow sensor 70 senses the reverse gas flow by its sensing portion 71, that indicates gas leakage in the inlet side of the conduit.

The flow sensor, therefore, serves as a leakage detector for checking the conduit for safe operation. With a large volume of the conduit portion between the valve 82 and the flow sensor 70, the reverse flow of gas may be large enough for the sensor to detect the occurrence of the gas leakage at the inlet side of the conduit. Accordingly, the flow sensor 70 is desirably shifted toward the inlet side of the flow meter 80.

When the gas flows along the conduit in the shown direction, the flow sensor not only senses the flow of gas by detecting heat transferred from the heating element 72 to the sensing element 73 but also detects an initial temperature of gas by the sensing element 71 that is useful for temperature compensation of the heating element 72 and the sensing element 73.

Figure 30A:
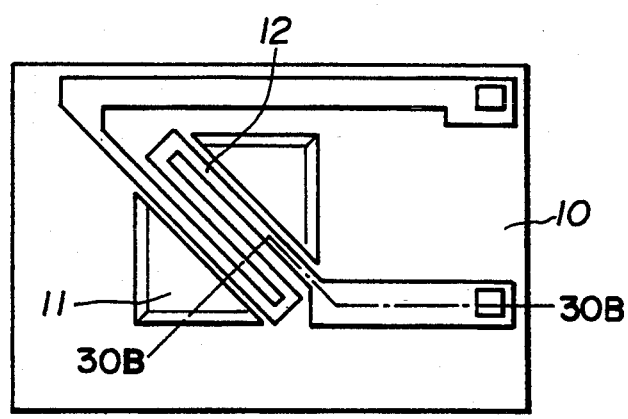
FIGS. 30(a) and 30(b) are views for explaining an embodiment of a flow sensor wherein two combinations of a heat layer and a sensing layer are formed one at each surface of a substrate.
Figure 30B:
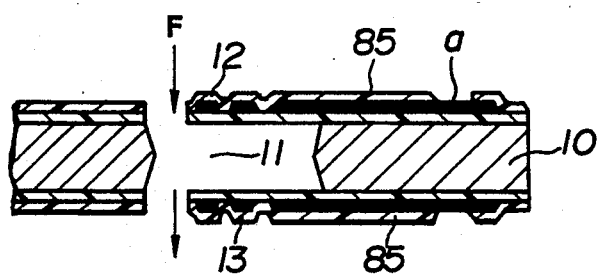

FIGS. 30(a) and 30(b) are views for explaining an embodiment of a flow sensor which has two heating layers and two sensing layers each one at both (upper and rear) surfaces of a substrate. FIG. 30(a) is a plan view and FIG. 30(b) is a section taken along line I—I of FIG. 30(a). There are shown a substrate 10, a through hole 11, an upper heating element 12, a lower sensing element 13, a passive film (for protection) 85 and a lead-out electrode a. Apparent from the above-described flow sensor having sandwiched layers which must be formed with due consideration to film adhesion strength, this embodiment provides that the same combinations of materials be applied to both surfaces of a substrate 10 with no consideration to the above-mentioned problem.

Figure 31:
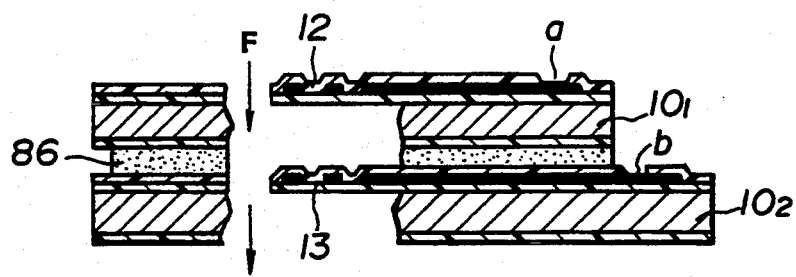
FIG. 31 is a sectional view of an embodiment which comprises two substrates bonded to each other, each of which has a heating layer and a sensing layer formed thereon.

FIG. 31 is a sectional construction view of an embodiment of a flow sensor comprising two substrates $10_1$ and $10_2$ each of which has a heating element 12 and a sensing element 13 formed thereon, and which are bonded to each other with adhesive 86 to achieve the like effect of the embodiment of FIG. 30. A plane view of this embodiment, therefore, is almost the same as shown in FIG. 30(a) excepting that lead-out electrodes a and b are disposed apart from each other not to be one above the other. The adhesive 86 may be of acrylic or epoxy resin or frit glass, soft solder, solder and so on.

Figure 32:
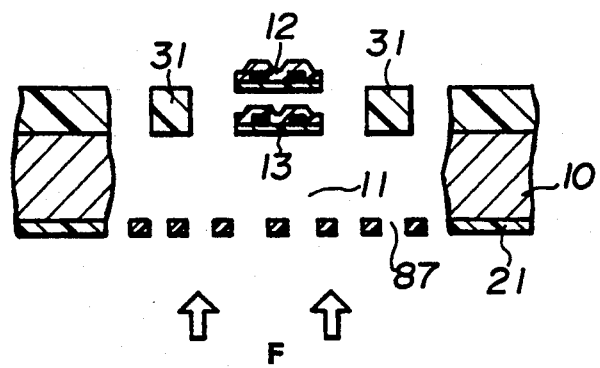
FIG. 32 is a view for explaining an embodiment of a flow sensor wherein a plurality of flow-rectifying elements and dust filters are formed by using a window for etching a through hole made in the substrate.

FIG. 32 is a view for explaining an embodiment of a flow sensor wherein flow rectifying elements and a dust filter are formed on a substrate 10 by utilizing a window for etching a through hole 11 in the substrate. FIG. 32 exemplifies a case of providing the above-mentioned components on the flow sensor shown in FIGS. 11(a), 11(b) and 11(c). The substrate 10 has a number of small holes 87 provided in the etching window portion of a layer 21 formed on the rear surface thereof.

Figure 33:
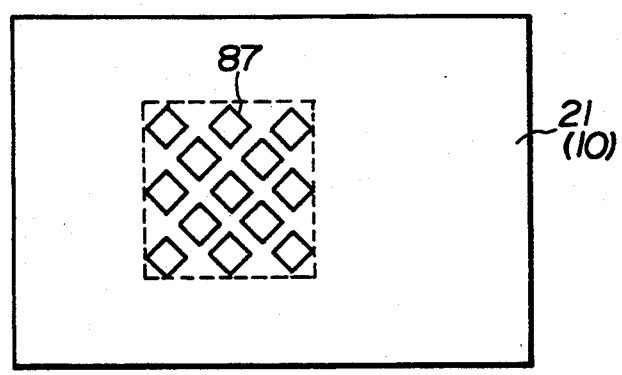
FIG. 33 is a view for showing the arrangement of square holes of a flow rectifying element at an angle to a Si(100) plane that they may be rhombuses.

FIG. 33 is a view of the substrate 10 with these holes 87 if it is looked at from the direction F of the gas flow. In the case when a silicon (100) plane substrate 10 is used, a number of square holes 87 are disposed diagonally to a silicon (111) plane, as shown in FIG. 33, not to allow any residue of silicon (111) plane within the through hole 11 to be formed in the substrate 10. A number of holes, if round-shaped, may be disposed at any angle to the silicon (111) plane. There is such a restriction that the small holes 87 shall be selectively etched against the substrate 10 and other layers. If a film 21 is of silicon dioxide (SiO2), it can be masked with a photoresistant and etched with a known etching solution of phosphoric acid. Other materials such as $Ta_2O_5$, MgO, $Si_3N_4$, $Al_2O_3$ can also be applied. Furthermore, it is possible to form a film of metal such as Ni, Al, NiCr, covar, stainless steel, Mo, Cr or of epoxy, polyimid or photoresist itself depending upon a combination of restrictions.

These small holes 87 are intended to serve as flow rectifiers and/or dust filters. They are well adapted to a series of micro-machining operations.

Figure 34:
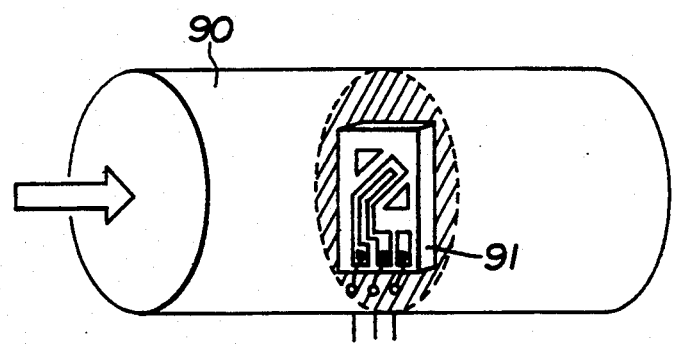
FIG. 34 is a view for explaining an example of a flow sensor of the type which allows gas to pass through its through hole when mounted in a flowmeter body.

FIG. 34 is a view for explaining an example of an application of a flow sensor of the type having a through hole for allowing gas to pass therethrough, which is mounted in a flow meter. Numeral 90 designates a conduit and numeral 91 designates a flow sensor which is disposed vertically to the flow of gas in the conduit as shown in FIG. 34. Furthermore, a flow sensor according to the present invention may be attached to a fluid-type flowmeter or a Kalman's vortex flowmeter to form a combination flowmeter.

All above-mentioned flow sensors are of the type supported at both ends.

Figure 35A:
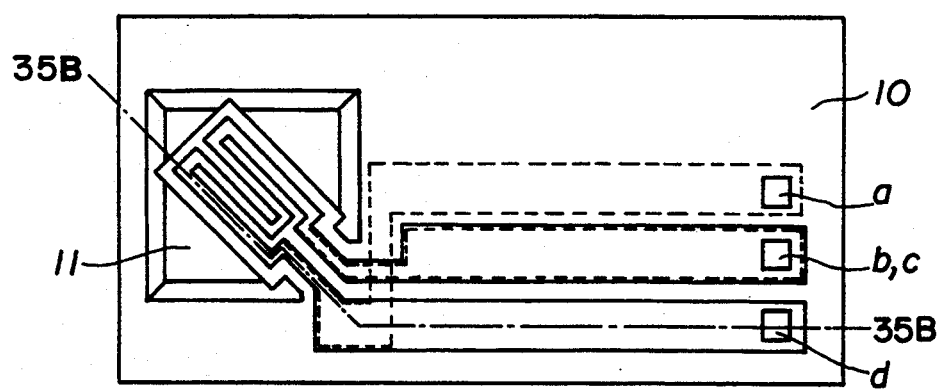
FIG. 35(a) and 35(b) are a schematic view of a flow sensor according to the present invention, which is of a cantilever type.
Figure 35B:
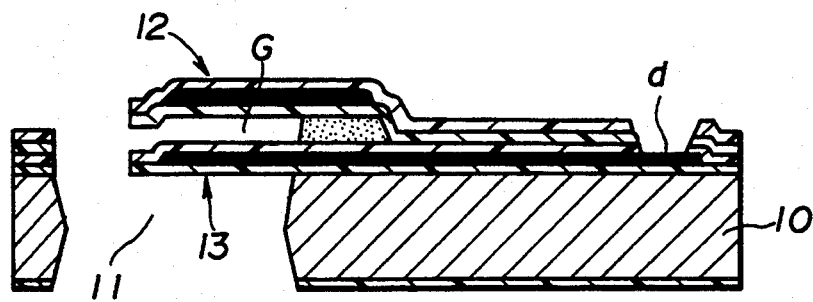

FIGS. 35(a) and 35(b) exemplify a flow sensor of a cantilever type supported at one end only. FIG. 35(a) is a plane view, and FIG. 35(b) is a section taken along line I—I of FIG. 35(a). The flow sensor comprises a substrate 10 with a through hole 11 formed therein, an upper heating layer 12 and a lower sensing layer 13. The upper heating layer 12 and the lower sensing layer 13 are formed in two-level layers separated from each other by a space G and supported at their one ends only on the substrate 10. Character "a" denotes an electrode for the upper heating layer. Character "b" and "c" designate electrodes commonly used for the upper heating layer and the lower sensing layer and character "d" denote an electrode for the lower sensing layer.

As is apparent from the foregoing, the present invention provides:

a flow sensor which has an improved efficiency of heat transfer from a heating portion to a sensing portion since the heating portion and the sensing portion are disposed in two layers near each other;

a flow sensor wherein a heating portion and a sensing portion are disposed in two layers one above the other with a very small interlayer clearance of 0.3 to 10 μm that is achieved by precisely forming a spacing film and then by removing it;

a flow sensor which has an improved efficiency of heat transfer with a uniform distribution of heat from a heating portion and uniform heat receiving by a sensing portion;

a flow sensor which is reliable and that has a long and useful life by virtue of and provision of a layer having a number of small holes, which is capable of serving as a laminar flow generating unit and as a dust filter through which gas may enter the flow sensor.

I claim:

1. A flow sensor comprising a substrate having a through hole or cavity formed therein, a heating layer portion and a sensing layer portion, said portions bridged each over the through hole or cavity and supported at both ends or at one end on the same surface of the substrate, characterized in that the heating layer portion and the sensing layer portion are laminated in two or more layers along the direction of a gas flow to be sensed and an interlayer air gap is provided between the heating layer portion and the sensing layer portion.

2. A flow sensor according to claim 1, characterized in that the heating layer portion and the sensing layer portion are formed of a resistance layer only.

3. A flow sensor according to claim 1 or 2, characterized in that a slot is provided in both the heating layer portion and the sensing layer portion or in the heating layer portion only.

4. A flow sensor according to claim 3, characterized in that the slot in the heating layer portion and the slot in the sensing layer portion are not aligned with each other.

5. A flow sensor according to claim 1, characterized in that a flow rectifying element is formed at the heating layer portion and/or the sensing layer portion.

6. A flow sensor according to claim 1, characterized in that the sensor has two sensing portions disposed one above and the other below, or one at the left hand side and the other at the right hand side from, the heating layer portion serving as an intermediate layer.

7. A flow sensor according to claim 1, characterized in that said substrate has a through hole, and that a flow rectifying film or a dust filter film, having a number of small holes therein, is provided opposite the side of the through hole of the substrate where the heating layer portion and the sensing layer portion are disposed.

8. A flow sensor comprising:
a first substrate having a through hole therein,
a heating portion bridged over the through hole and supported at both ends or at one end on the first substrate,
a second substrate having a through hole therein, and
a sensing portion bridged over the through hole and supported at both ends or at one end on the second substrate,
characterized in that the first substrate and the second substrate are integrally bonded to each other with their through holes coaxially matched.

9. A flow sensing method comprising:
causing fluid flow in a flow direction through an opening in a substrate bridged by a heating layer portion and a sensing layer portion;
said heating layer portion and sensing layer portion conforming to respective planes which are substantially perpendicular to said flow direction;
each of the heating layer portion and the sensing layer portion having at least one end supported on the substrate;
said heating layer portion and said sensing layer portion being spaced from each other by an air space therebetween in said flow direction; and
utilizing said sensing layer portion to sense transfer of heat thereto from said heating layer portion.

* * * * *